(12) United States Patent
Hu et al.

(10) Patent No.: US 11,605,012 B2
(45) Date of Patent: Mar. 14, 2023

(54) FRAMEWORK FOR PROCESSING MACHINE LEARNING MODEL METRICS

(71) Applicant: Intuit Inc., Mountain View, CA (US)

(72) Inventors: Qingbo Hu, Foster City, CA (US); Sumanth Venkatasubbaiah, San Jose, CA (US); Caio Vinicius Soares, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 400 days.

(21) Appl. No.: 16/805,656

(22) Filed: Feb. 28, 2020

(65) Prior Publication Data

US 2021/0271986 A1    Sep. 2, 2021

(51) Int. Cl.
| | |
|---|---|
| *G06N 5/04* | (2006.01) |
| *G06N 20/00* | (2019.01) |
| *G06F 11/30* | (2006.01) |
| *G06F 9/54* | (2006.01) |
| *G06N 20/20* | (2019.01) |

(52) U.S. Cl.
CPC .......... *G06N 5/04* (2013.01); *G06F 9/54* (2013.01); *G06F 11/302* (2013.01); *G06N 20/00* (2019.01); *G06N 20/20* (2019.01); *G06F 2201/86* (2013.01)

(58) Field of Classification Search
CPC .......... G06N 5/04; G06N 20/00; G06N 20/20; G06F 9/54; G06F 11/302; G06F 2201/86; G06F 11/3466; G06F 11/3612; G06F 11/3409; G06F 2201/865; G06F 2201/88
See application file for complete search history.

(56) References Cited

U.S. PATENT DOCUMENTS

| | | | | |
|---|---|---|---|---|
| 2017/0006135 A1* | 1/2017 | Siebel | ................ | G06N 20/00 |
| 2019/0158362 A1* | 5/2019 | Sebih | .................... | G06F 9/5072 |
| 2020/0160229 A1* | 5/2020 | Atcheson | ............... | G06N 20/00 |
| 2020/0401696 A1* | 12/2020 | Ringlein | ................ | G06N 3/08 |
| 2021/0097168 A1* | 4/2021 | Patel | .................... | G06F 21/566 |

OTHER PUBLICATIONS

Simon, J., "Amazon SageMaker Model Monitor-Fully Managed Automatic Monitoring for your Machine Learning Models", Amazon SageMaker Model Monitor, Dec. 3, 2019, 18 pages.

* cited by examiner

*Primary Examiner* — Abdullahi E Salad
(74) *Attorney, Agent, or Firm* — Ferguson Braswell Fraser Kubasta PC

(57) ABSTRACT

A method including extracting, from an input, supported data. The input includes outputs from machine learning models in different formats. The supported data includes a subset of the input after data normalization. The method also includes inferring, from the supported data, data types to be used with respect to generating metrics for the machine learning models. The method also includes generating, from the supported data and using the data types, a relational event including the supported data. The relational event further includes a first data structure object including the types and having a first data structure different than the different formats. The method also includes calculating, using the supported data in the first data structure, the metrics for the machine learning models. The method also includes generating, from the relational event, a monitoring event. The monitoring event includes a second data structure object segmented into data buckets storing the metrics.

20 Claims, 7 Drawing Sheets

FRAMEWORK FOR PROCESSING MACHINE LEARNING MODEL METRICS

BACKGROUND

Machine learning models are commonly used in business enterprises. A business enterprise is hardware and/or software that forms the technical infrastructure supporting the operations of the business. The operations and results produced by the machine learning models are regularly monitored to ensure proper functioning of the machine learning models, as well as proper functioning of the business enterprise, generally. A large business enterprise may deploy many, even thousands, of machine learning models.

SUMMARY

The one or more embodiments provide for a method. The method includes extracting, from an input, supported data. The input includes outputs from machine learning models in different formats. The supported data includes at least a subset of the input after data normalization. The method also includes inferring, from the supported data, data types to be used with respect to generating metrics for the machine learning models. The method also includes generating, from the supported data and using the data types, a relational event including the supported data. The relational event further includes a first data structure object including the types and having a first data structure different than the different formats. The method also includes calculating, using the supported data in the first data structure, the metrics for the machine learning models. The method also includes generating, from the relational event, a monitoring event. The monitoring event includes a second data structure object segmented into data buckets which store the metrics.

The one or more embodiments also provide for a system. The system includes a data repository. The data repository stores a first result of a first machine learning model. The first result includes a first initial data structure having a first format. The data repository also stores a second result of a second machine learning model, the second result including a second initial data structure having a second format different than the first format. The data repository also stores supported data including at least a subset of the first result and the second result after data normalization. The data repository also stores a relational event, including a first data structure which stores the supported data. The data repository also stores metrics for the first machine learning model and the second machine learning model. The data repository also stores a monitoring event, including a second data structure storing the metrics in data buckets. The system also includes a data pipeline programmed, when executed, to generate the relational event by extracting the supported data from the first result and the second result into the relational event. The system also includes a metric pipeline programmed, when executed, to calculate the metrics, and generate the monitoring event from the metrics. The system also includes a model monitoring service including the data pipeline and the metric pipeline. The system also includes an application programming interface (API) in communication with the model monitoring service. The API is configured to allow a user to modify or monitor operation of the model monitoring service.

The one or more embodiments also provide for a method. The method includes extracting, from an input, supported data. The input includes outputs from machine learning models in different formats. The supported data includes at least a subset of the input after data normalization. The method also includes inferring, from the supported data, data types to be used with respect to generating metrics for the machine learning models. The method also includes generating, from the supported data and using the data types, a relational event including the supported data. The relational event further includes a first data structure object including the data types and having a first data structure different than the different formats. The method also includes calculating, using the supported data in the first data structure, the metrics for at least one of the machine learning models. Calculating also includes identifying dependent metrics in the metrics. Calculating also includes using intervening metrics computed from previous steps within an execution pipeline that calculates the metrics to calculate the dependent metrics. Calculating also includes generating, from the relational event, a monitoring event. The monitoring event includes a second data structure object segmented into data buckets which store the metrics.

Other aspects of the invention will be apparent from the following description and the appended claims.

DETAILED DESCRIPTION

Figure 1:
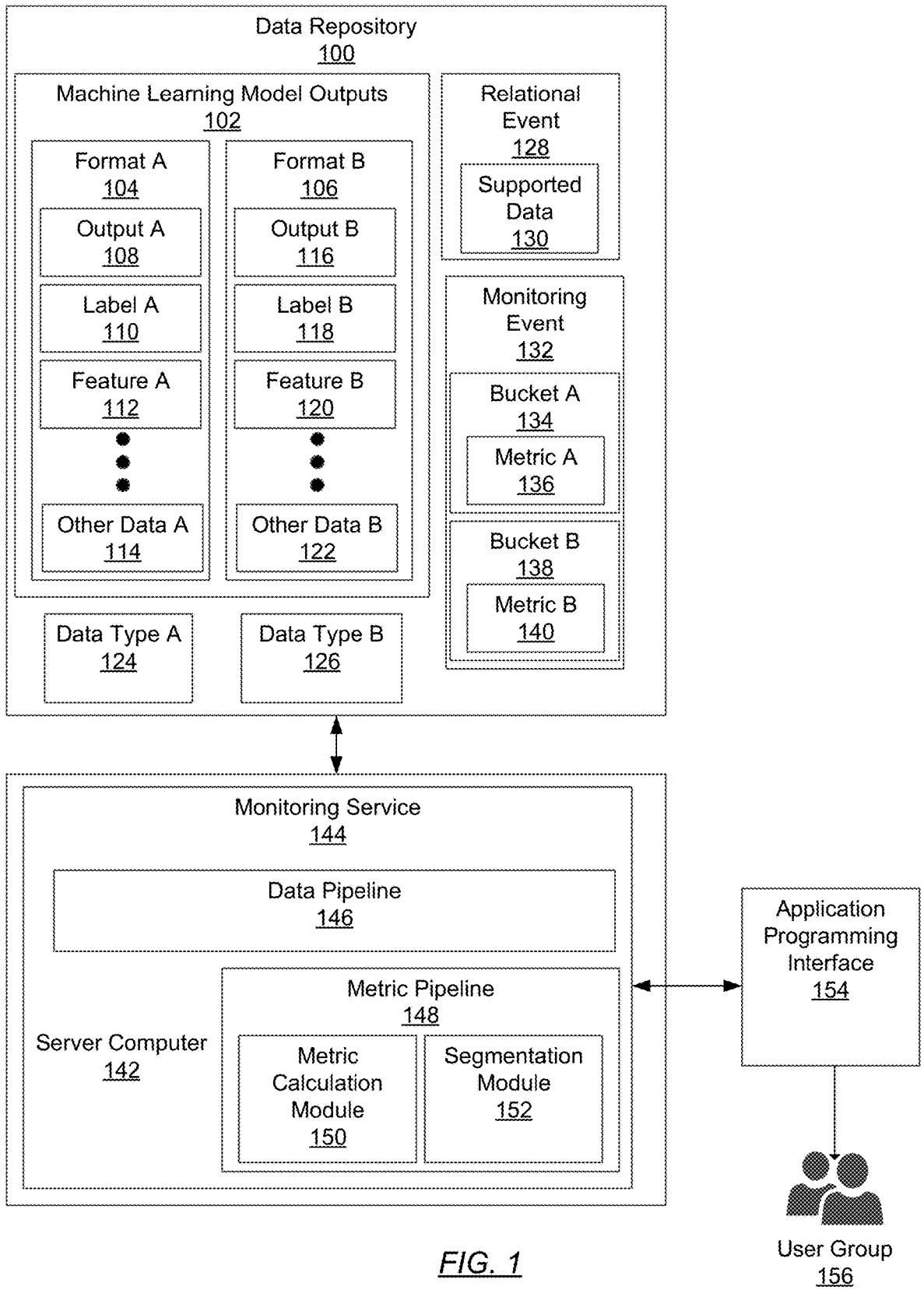
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a framework, known as a model monitoring service, for generating and processing machine learning model metrics for ongoing monitoring of in-production machine learning models in an enterprise environment. As indicated above, a scaled enterprise environment may use a plethora of machine learning models, many of which use or produce results in different data formats known as schema.

In the past, each machine learning model had to be monitored separately by a data technician, who manually sets up model monitoring, alerting, and maintenance. The term "manual," in this case, refers to programming a computer to monitor a machine learning model by specifying monitoring parameters, alerts, conditions, etc., some or all of which may require generating computer code for the intended special purpose. In some cases, manually setting up model monitoring and alerting is not practical, is computationally expensive, or is otherwise considered undesirable.

In one or more embodiments a structured framework, known as the model monitoring service, is provided which automatically generates machine learning model metrics for some or all of the machine learning models being used by the enterprise environment, regardless of the types of machine learning model or the types of data structures used or produced by the different machine learning models. Thus, one or more embodiments address the technical challenge of programming a computer system to automatically monitor and maintain the operation of disparate machine learning models in an enterprise environment.

In particular, the one or more embodiments are directed to setting up pipelines to generate model metrics (like precision, recall, etc.) for ongoing monitoring of in-production machine learning models. The one or more embodiments address several technical challenges.

A technical challenge is that the data used to compute such model metrics usually come from different locations across different time spans. For example, the ground truth labels used to verify a model's prediction results are usually collected days, weeks, or months later after the prediction is made by the model. Additionally, different machine learning models will have different schema for these data sources, which makes more difficult the process of setting up pipelines one by one to integrate data sources for each of the machine learning models.

A technical challenge is that, although standard model metrics (accuracy, precision, recall etc.), have unanimous definitions, applying one metric logic to all machine learning models is difficult. For example, accuracy is a common model metric for classification problems. Accuracy is decided by counts such as "how many entities are classified correctly". However, correctly defining the term "classified correctly" varies in different machine learning models.

A technical challenge is that machine learning model owners also need a way to create metrics by using their own customized logic. However, after implementing such customized metrics, the challenge is how to generate standardized metrics useable for a custom machine learning model.

A technical challenge is that, to fully analyze in-production model performance, model owners also may desire to create different segments. A segment represents a subset of the original data set. The model owner may desire to compute metrics per segment. For example, a programmer may wish to create segments for users according to their regions, age groups etc., recompute the accuracy metric again for each segment, and compare the result with the entire population of segments. However, it is difficult to reuse the metrics for the global data set on each segment and efficiently set up pipelines to generate the metrics for various generic machine learning models.

A technical challenge is that some model metrics have natural dependencies by their definition. For example, accuracy, precision, and recall for classification models can be computed if a confusion matrix is already precomputed. How to utilize such dependency to avoid redundant computation in pipelines is challenging.

The above technical challenges are addressed, at least in part, by the model monitoring service and methods described herein. Attention is now drawn to the figures.

FIG. 1 shows a computing system, in accordance with one or more embodiments of the invention. The computing system shown in FIG. 1 may be used to implement the model monitoring service shown in FIG. 2 through FIG. 5, to support the method shown in FIG. 6, or to implement the example shown in FIG. 7. The computing system shown in FIG. 1 may be implemented using the computing system (800) shown in FIG. 8A and FIG. 8B.

In one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site.

The data repository (100) stores a variety of data, such as machine learning model outputs (102). The machine learning model outputs (102) are produced by a variety of different machine learning models. While some of the machine learning model outputs (102) may have the same formats, or schema, at least some (usually most) of the machine learning model outputs (102) have different formats, or schema. As used herein, the term "format" will be used to refer to a "data type" or "schema" of a data structure. A "format" may take the form of a data structure which arranges and stores data, such as but not limited to a table, a tree, a trie, a tensor, etc. The data structure may store data of a variety of different types, including numbers, alphanumeric characters, images, computer code, etc.

In the example of FIG. 1, the machine learning model outputs (102) includes two different machine learning model outputs (102) in two different formats: Format A (104) and Format B (106). Format A (104) represents the output of a first machine learning model, referenced as Output A (108), in a first specific schema. The Format A (104) may include a variety of data such as, but not limited to, Label A (110), Feature A (112), and Other Data A (114).

Likewise, Format B (106) represents the output of a second machine learning model, referenced as Output B (116). The Format B (106) may include a variety of data such as, but not limited to, Label B (118), Feature B (120), and Other Data B (122), as with the Format A (104).

A label is a type of data representing a prediction or name applied to some result predicted by the first machine learning model. A feature is another variety of data which a machine learning model may use during execution of the machine learning model to produce the result. In other words, either the output of a machine learning model may include one or more of the features used as input to the machine learning model, or the input of the machine learning model is of interest to the computer programmer responsible for monitoring the machine learning model in question.

In summary, the Output A (108) may be characterized as a first result of a first machine learning model. The first result has a first initial data structure; namely, Format A (104). Similarly, the Output B (116) may be characterized as a second result of a second machine learning model. The second result has a second initial data structure; namely, Format B (106). The Format A (104) and the Format B (106) may have different formats.

The data repository (100) may also store data types to be used with respect to generating the metrics from the machine learning model outputs (102). Two sets of data types are shown, Data Type A (124) and Data Type B (126), though more or fewer data types may be present. The Data Type A (124) and the Data Type B (126) are data structures in different formats used to store the metrics described below with respect to FIG. 6. Note that a "data type" is distinguished from a data "format". Again, with respect to FIG. 1, a "format" is a schema or kind of data structure that holds the output of one or more machine learning models, whereas a "data type" is the schema or kind of data structure that holds the metrics generated by the metric pipeline (148), described below.

The data repository (100) also stores a relational event (128). The relational event (128) is a data structure for storing data. Specifically, the relational event (128) stores supported data (130). The term "supported data" refers to a type of data that is supported by the data structure of the relational event (128), such as numerical data (integers, real numbers, etc.), categorical data (string data, Boolean data, etc.), composite data (lists of numerical data, etc.), and possibly other data types. The supported data (130) is at least a subset of the data contained in Format A (104) and Format B (106) (which may be, for example, Output A (108) and the Output B (116) after data normalization).

Data normalization is the process of transforming data from one format into another format. As used herein, data normalization involves transforming data from the Format A (104) or the Format B (106) into the standardized format used by the relational event (128). However, not all data from the machine learning model outputs (102) might be able to be normalized; thus, it is possible that the supported data (130) may include less than all of the data from the machine learning model outputs (102).

As mentioned above, the data structure of the relational event (128) is in a standardized format independent of the formats of any of the outputs of the machine learning model outputs (102). Thus, the supported data (130) contains some or all of the data stored in the Format A (104) and/or the Format B (106) of the machine learning model outputs (102). However, at a minimum, one or more workflows have been performed on the machine learning model outputs (102) such that the supported data (130) conforms to the following two specifications: 1) the supported data (130) is stored in the standardized format (whether originally in the standardized format or normalized to be in the standardized format), and 2) data not in the standardized format is excluded from the relational event (128). The process of generating the relational event (128) with the supported data (130) from the machine learning model outputs (102) is described with respect to FIG. 6.

The data repository (100) also includes a monitoring event (132). The monitoring event (132) is also a data structure for storing data. However, the structure of the monitoring event (132) is compartmentalized into sub-structures referred-to as "buckets." Each bucket stores a specific metric for a specific machine learning model. Thus, for example, the monitoring event (132) includes Bucket A (134) which stores Metric A (136), and may also include Bucket B (138) which stores Metric B (140).

The system shown in FIG. 1 may include additional components. For example, the system shown in FIG. 1 may include a server computer (142). The server computer may be the computing system (800) in FIG. 8A, or some or all of the nodes shown in FIG. 8B.

The server computer (142) executes a monitoring service (144). The monitoring service (144) is software and/or application specific hardware configured to manage the generation of the relational event (128), the monitoring event (132), and the various services that support the generation of the two data structures. For example, the monitoring service (144) may also compute the metrics that are stored in the monitoring event (132), and may also include rules for generating the relational event (128). The monitoring service (144) may include other services, such as rules for modifying machine learning models being monitored, code for displaying the relational event (128) and/or the monitoring event (132), and possibly other services.

One of the services provided by the monitoring service (144) is a data pipeline (146). The data pipeline (146) is a computer program configured to generate the relational event (128) from the machine learning model outputs (102). In particular, the data pipeline (146) may be programmed, when executed, to generate the relational event (128) by extracting the supported data (130) into the relational event from a first result of a first machine learning model and a second result of a second machine learning model in the machine learning model outputs (102). Note that the first machine learning model and the second machine learning model may be the same machine learning model which produces multiple outputs based on multiple executions on multiple inputs. Thus, in an embodiment, a single data pipeline is configured using different outputs of a single machine learning model. However, conceptually, multiple machine learning model outputs from a single machine learning model may be visualized as the outputs of two machine learning models. Thus, the configuration shown in FIG. 1 is accurate for both the case that two different machine learning models are used, and the case that one machine learning model with multiple outputs is used.

The data pipeline (146) may also be programmed to normalize the machine learning model outputs (102) prior to generation of the relational event (128). The data pipeline (146) may also be programmed to extract only data from the machine learning model outputs (102) that is compatible with the relational event (128). Additional details regarding the data pipeline (146) are described with respect to FIG. 2 and FIG. 3. Operation of the data pipeline (146) is described with respect to FIG. 6.

Another one of the services provided by the monitoring service (144) is a metric pipeline (148). The metric pipeline (148) is a computer program configured to generate the monitoring event (132) from the relational event (128). In particular, the metric pipeline (148) is programmed, when executed, to calculate the metrics (such as Metric A (136) and Metric B (138)), and generate the monitoring event (132) from the metrics. The metric pipeline (148), in some embodiments, may load both the relational event (128) and the monitoring event (132), in the case that a past monitoring event is to be used by the metric pipeline (148). Additional details regarding the metric pipeline (148) are described with respect to FIG. 2, FIG. 4, and FIG. 5. Operation of the metric pipeline (148) is described with respect to FIG. 6.

Either pipeline may be composed of logical sub-segments of computer code, known as modules. For example, the metric pipeline (148) may include a metric calculation module (150) and a segmentation module (152). The metric calculation module (150) is programmed, when executed, to calculate the metrics from the machine learning model outputs (102). Possibly many metric calculation modules may be present, with each such module configured to generate multiple, different types of metrics from the relational event (128) and/or the monitoring event (132). The segmentation module (152) is programmed, when executed, to segment the metrics into the buckets, such as Bucket A (134) and Bucket B (138). The metric calculation module (150) and the segmentation module (152) are described in more detail with respect to FIG. 2 through FIG. 5, with their corresponding operations described further with respect to FIG. 6.

The monitoring service (144) may be in communication with an application programming interface (154). The application programming interface (154), or "API" is computer code defining a set of functions and procedures that serve as an interface or communication protocol between different parts of a computer program, or between different computer programs. As used herein, the application programming interface (154) enables additional programs used by a user group (156) to perform various functions with respect to the monitoring service (144), along with inputs and outputs of the monitoring service (144). Stated differently, the application programming interface (154) is in communication with the model monitoring service (144), and is configured to allow a user to modify or monitor operation of the model monitoring service (144).

For example, the application programming interface (154) may allow the user group (156) to view the relational event (128) and/or the monitoring event (132), to control generation of the relational event (128) and/or the monitoring event (132), to provide instructions on how the monitoring event (132) may be used to modify one or more of the machine learning model outputs (102), and possibly many other functions. The application programming interface (154) may also enable interaction between the monitoring service (144) and a dashboard or graphical user interface that the user group (156) uses to control various services and functions of the monitoring service (144).

In FIG. 1, the monitoring service (144) is shown separate from the application programming interface (154). However, in some embodiments, the application programming interface (154) may be part of the monitoring service (144), such as in the arrangement shown in FIG. 2.

As an example of an additional function of the monitoring service (144), the monitoring service (144) may be programmed to present the monitoring event (132). The term "present," when used with the monitoring event (132), refers to a computer-based action taken with respect to the monitoring event (132). Examples of "presenting" the monitoring event (132) include, but are not limited to: storing the monitoring event (132); displaying the monitoring event (132) to a user on a computer display; feeding the monitoring event (132) to another function of the monitoring service (144) (such as for generating an alert when data in the monitoring event (132) satisfies a condition), presenting a line plot or other visualized format in a figure to show the change of one or more metrics over time, and changing one or more of the machine learning models using the data in the monitoring event (132).

An alert is an email, text, pop-up display, audio report, or some other indication that the condition has been satisfied. The condition is user-designated and may depend on the metrics and/or the machine learning model outputs (102). An example of a condition may be, for example, to alert a user when the Metric A (136) reaches or passes a threshold value.

The monitoring service (144) may perform still other services. For example, the monitoring service (144) may be programmed to modify the monitoring event (132) to have an original format matching at least one of the machine learning models that generated the machine learning model outputs (102). In this manner, at least one of the machine learning models may be modified directly using the monitoring event (132).

While FIG. 1 shows a configuration of components, other configurations may be used without departing from the scope of the invention. For example, various components may be combined to create a single component. As another example, the functionality performed by a single component may be performed by two or more components.

Figure 2:
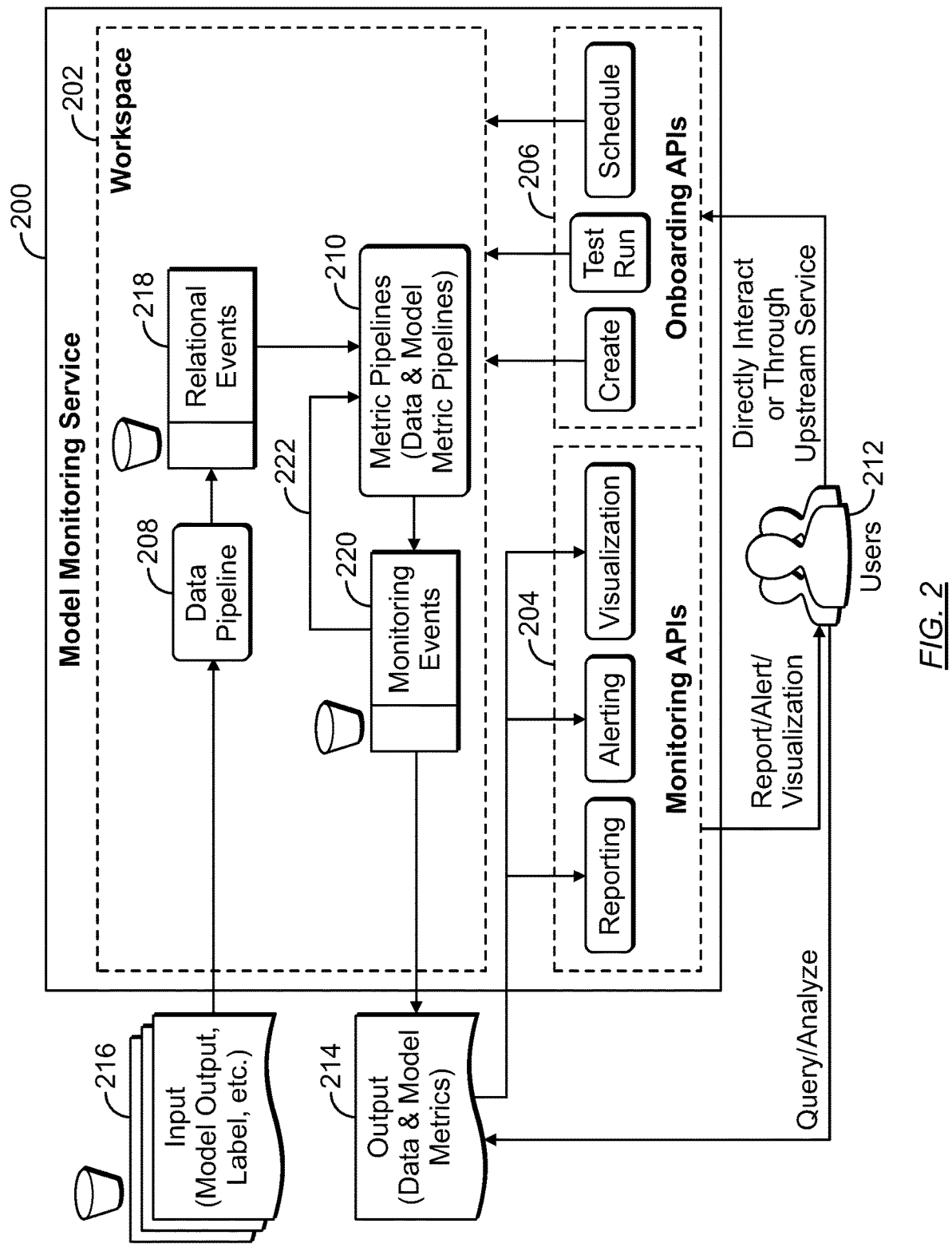
FIG. 2 shows an example of a model monitoring service, in accordance with one or more embodiments of the invention.

FIG. 2 through FIG. 5 show various aspects of the monitoring service (144) described with respect to FIG. 1. Thus, FIG. 2 through FIG. 5 use common reference numerals, and should be viewed together. FIG. 2 through FIG. 5 show the logical arrangement of various software modules. Operation of the various modules shown in FIG. 2 are described with respect to FIG. 6.

Starting with FIG. 2, FIG. 2 shows an example of a model monitoring service (200), in accordance with one or more embodiments of the invention. The model monitoring service (200) may be the monitoring service (144) described and defined with respect to FIG. 1. In this example, the model monitoring service (200) includes three major components, including a workspace (202), monitoring APIs (204), and onboarding APIs (206). Again, the term "API" refers to "application programming interface," as defined above.

The workspace (202) includes a data pipeline (208) and metric pipelines (210). The data pipeline (208) may be the data pipeline (146) and the metric pipelines (210) may be the metric pipeline (148), as described with respect to FIG. 1. Note that the term "metric pipelines" (210) is used in FIG. 2, as in this example multiple pipelines are present which each calculate a different metric or set of metrics.

The APIs allow one or more users in a user group (212) to interact with the model monitoring service (200), and in particular with various aspects of the workspace (202). In the example shown, two sets of APIs are included, the monitoring APIs (204) and the onboarding APIs (206). The monitoring APIs (204) provide code that allows the user group (212) to manipulate or provide instructions to the data pipeline (208) and/or the metric pipelines (210). Thus, for example, the onboarding APIs (206) allow the user group (212) to create new data pipelines or new metric pipelines (210), run tests, and schedule operations. In turn, the monitoring APIs (204) provide computer code for monitoring the output (214) of the workspace (202). Thus, for example, the monitoring APIs (204) allow the user group (212) to generate reports on the output (214), create alerts based on the output (214), and visualize the output (214).

The input (216) is provided to the data pipeline (208), which then generates the relational events (218). The metric pipelines (210) then generates the monitoring events (220) based on the relational events (218). Note that a feedback arrow (222) is provided from the monitoring events (220) to the metric pipelines (210). As indicated above, the monitoring events (220) being generated may be fed back into the metric pipelines (210) in order to generate new, additional monitoring events (220).

Thus, the model monitoring service (200) of FIG. 2 may be used to set up pipelines to generate metrics for on-going monitoring of different generic machine learning models. The model monitoring service (200) solves the technical challenges described above, prior to the description of FIG. 1, as follows.

First, the model monitoring service (200) may be programmed to create generic data pipelines from a configuration set up from the model owners without any coding effort. The generated data pipelines may load multiple data sets stored in different locations with distinct schema from various date ranges. Thus, the model monitoring service (200) is able to load data schema that contains complicated generic formats like maps or other data structures.

Afterwards, in the same configuration file used to create the pipelines, a user can write integration logic in a domain specific language (e.g., a search query language, such as SQL) to join the loaded data sources. The output of the data pipelines then have a standard schema defined by the model monitoring service (200) (namely, the relational events (218)) so that metric generation logic may be re-used to calculate metrics for generic machine learning models.

Second, the model monitoring service (200) also addresses the technical challenges described above by providing customizable metrics. Specifically, based on the schema generated by data pipeline (208), the model monitoring service (200) defines an Application Programming Interface (API). The programming API may then be used to implement standard machine learning model metrics with a customizable configuration. For example, with respect to an accuracy metric for classification problems, the model owner may configure the condition to specify what is a "correct prediction" in a SQL-like language, and then the rest of metric calculation will follow the standard definition of accuracy.

Third, the model monitoring service (200) also addresses the technical challenges described above by using a commonly defined API. Specifically, the same programming API is accessible to the model owners so that the model owners can implement customizable metric calculation in their own logic. Because metrics are generated by the same API, any customized metric will work exactly as any standard metrics.

Fourth, the model monitoring service (200) also addresses the technical challenges described above by providing for output (214) schema to be compatible with the original input (216). For example, based on the schema generated by data pipeline (208), the model monitoring service (200) may also provide a programming API to create output (214) segments based on the entire data sets. As a result, the API may ensure that the data schema of each segment will be the same as the original global data sets. In turn, using the same schema ensures all the metrics for global data sets can be seamlessly reused in any segment.

Fifth, the model monitoring service (200) also addresses the technical challenges described above by using a standardized schema for the output (214). Specifically, the model monitoring service (200) may create metric pipelines (210) to generate various metrics stored in a standard schema defined, namely the monitoring events (220). Using the model monitoring service (200), the user group (212) is able to configure the metric pipelines (210) not only for each individual metric calculation and segmentation, but also the workflow to describe the dependency of the metrics to avoid redundant computation. In addition, the user group (212) may describe the dependency between metrics across various dates. As a result, redundant computation may be avoided while retaining accuracy in the output (214) metrics.

Thus, the model monitoring service (200) is configured to set up pipelines to generate model metrics to monitor machine learning model output (214), regardless of the type of machine learning model used. In this manner, the model monitoring service (200) addresses all the technical challenges described above. Since the model monitoring service (200) has the capability to load any generic data source, the model monitoring service (200) is also able to be adopted and embedded in any specific machine learning platform.

Figure 3:
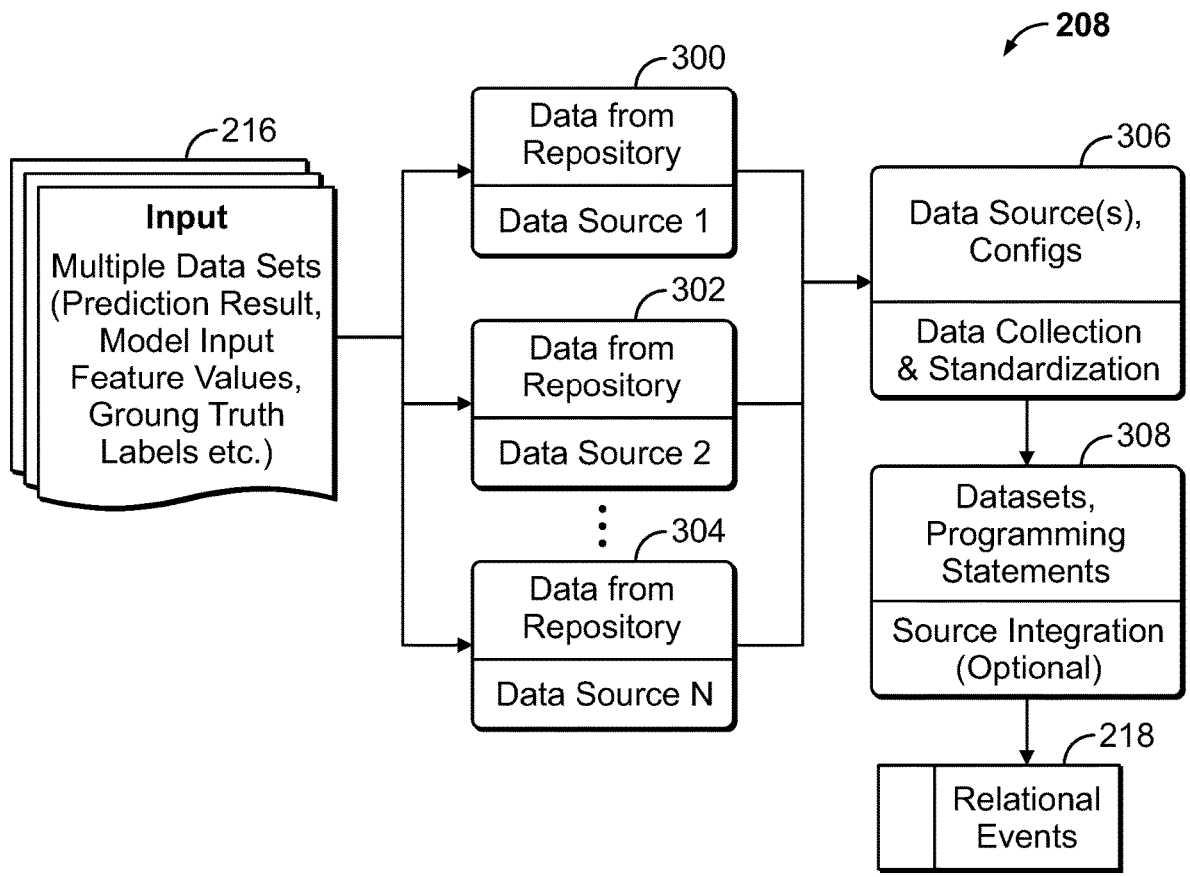
FIG. 3. shows an example of a data pipeline of a model monitoring service, in accordance with one or more embodiments of the invention.

FIG. 3. shows an example of a data pipeline of a model monitoring service, in accordance with one or more embodiments of the invention. As used herein, reference numerals in the 300 series refer to aspects of the data pipeline (208) described with respect to FIG. 2.

The data pipeline (208) may initiate different source objects and load each data source from a user-defined date range as one generic data element (306), such as an APACHE SPARK® data frame. Initially, the multiple data sets in the input (216) are parsed into multiple data elements, such as first data element (300), second data element (302), and third data element (304). Each data element contains data from the data repository from a single data source. The model monitoring service (see (200) of FIG. 2) may also register a temporary view name defined by the technician to represent each data element. The data sources, configurations, and collected and standardized data are combined into the generic data element (306).

When the data pipeline (208) loads multiple data sources, the user may provide a list of programming statements (308) (such as in SQL) to integrate different data elements. The model monitoring service (see (200) of FIG. 2) may then execute the programming statements sequentially using configuration scripts.

If there is only one data source, an integration list is optional. If the integration list is missing, the data pipeline (208) may treat the loaded data element from the single source as the final data element.

Note that the data pipeline (208) may scan the generic data element (306) and only extract those columns of the data formats that are supported by the model monitoring service (see (200) of FIG. 2). Examples of supported data formats include numerical data, categorical data, and lists of numerical and categorical data. Afterwards, for each row of the data, the data pipeline (208) may initialize the data pipeline (208), which is a data object used to represent a piece of data upon which the metric pipeline can compute the metrics.

The standardization process is useful for establishing the reusability of the metric calculation, since although the user's source data might be generic, the result of the data pipeline (208) will be standard. As a result, implemented metrics may be reused across multiple models.

Optionally, the data pipeline (208) may be encrypted, as the data pipeline (208) may contain sensitive information. In this manner, the results of the data pipeline (208) cannot be accessed, except by the service account used by the model monitoring service (see (200) of FIG. 2) to execute the data pipeline (208).

Figure 4:
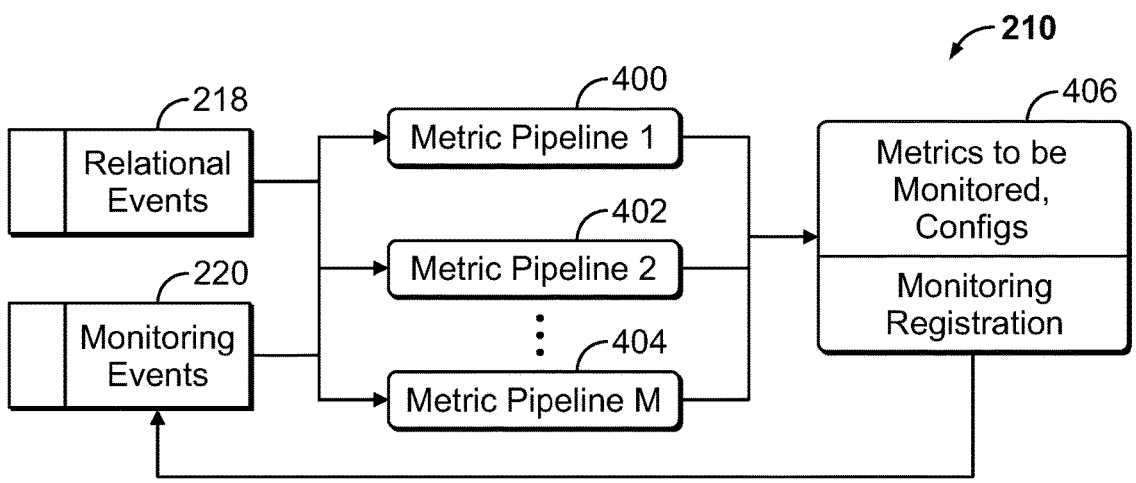
FIG. 4 shows an example of a metric pipeline of a model monitoring service, in accordance with one or more embodiments of the invention.

FIG. 4 shows an example of a metric pipeline of a model monitoring service, in accordance with one or more embodiments of the invention. As used herein, reference numerals in the 400 series refer to aspects of the metric pipelines (210) described with respect to FIG. 2.

The metric pipelines (210) takes as input the relational events (218) generated by the data pipeline (see (208) of FIG. 2), possibly together with monitoring events previously generated by the model monitoring system. Each metric pipeline in the metric pipelines (210), such as first metric pipeline (400), second metric pipeline (402), and third metric pipeline (404), represents a logically separate computer program that calculates a metric from the data pipeline (see (208) of FIG. 2). "Logically separate" means that each metric pipeline is a sequential workflow not logically connected to the programming code of the other metric pipelines (210).

As shown in FIG. 4, the model monitoring service (see (200) of FIG. 2) is able to run the different metric pipelines (210) in parallel to increase system efficiency. However, if dependencies are present, it is possible to execute any of the metric pipelines (210) in sequence rather than in parallel. Each metric pipeline is able to independently load the output of the data pipeline, which is the relational event persisted in the storage system (see (208) of FIG. 2).

The outputs (406) of the metric pipelines (210), along with any configurations and registrations, may be combined into a single generic data object, which is one or more of the monitoring events (220). In an embodiment, the monitoring events (220) may store only aggregated model level metrics so as not to contain any sensitive data.

Note that the monitoring events (220) also may be loaded into the metric pipelines (210). In other words, the results of past monitoring events may also be provided to the metric pipelines (210) in order to account for dependencies. Accordingly, each metric pipeline can compute metrics based on collected data by data pipelines, as well as the previous execution results from any metric pipelines (210), when called.

Figure 5:
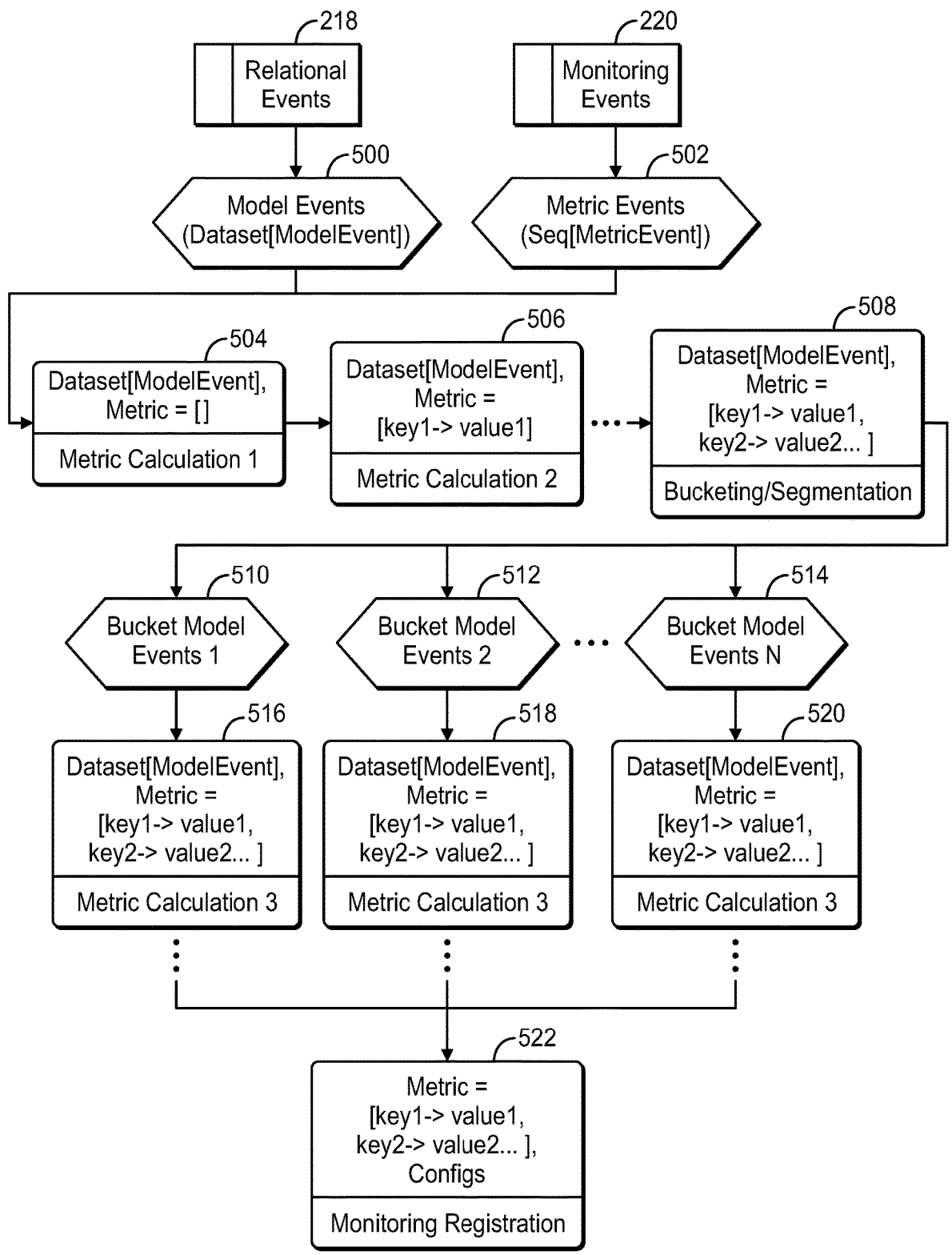
FIG. 5 shows another example of a metric pipeline of a model monitoring service, in accordance with one or more embodiments of the invention.

FIG. 5 shows another example of a metric pipeline of a model monitoring service, in accordance with one or more embodiments of the invention. FIG. 5 shows additional details of the any of the individual metric pipelines shown in FIG. 4. Thus, the features shown in FIG. 5 may be present in any of first metric pipeline (400), second metric pipeline (402), and third metric pipeline (404) in FIG. 4.

As indicated above, each metric pipeline receives the relational events (218) and/or monitoring events (220) that had been previously generated by the model monitoring service (see (200) of FIG. 2). In an embodiment, the relational events (218) may be further modified, in a manner not seen by the user, into one or more model events (500). Similarly, any past monitoring events (220) may be further modified, in a manner not seen by the user into one or more metric events (502).

Thus, a metric pipeline, such as first metric pipeline (400), will load the one or more model events (500) and the one or more metric events (502) objects according to the configurations provided by the user. However, relational events (218) and the monitoring events (220) may be used for internal storage purpose and contains redundant fields that are not efficient for computing metrics. Thus, the one or more embodiments provide for "event views" (the model events (500) and the metric events (502)) which are simplified and computing-friendly data structures that can be used for processing the events. When computing a metric, the corresponding event view for the relational events (218) are the model events (500), and the corresponding event view for monitoring events (220) are the metric events (502).

As indicated above, the conversion between internal data structures and event views may be transparent to the users. As a result, when computer scientists want to develop their own custom metrics, the computer scientists might only interact with the event views.

The use of the model events (500) and the metric events (502) may have other advantages. For example, separating event views from internal storage structures also allows developers to create different views to interpret the stored events. Separating event views from internal storage structures also provide for better security by hiding unnecessary information that is not required by users.

After loading the data, the metric pipeline may sequentially execute a workflow to produce all the metrics. The basic element in a workflow may be termed a "computational module," of which may be one of two types: metric calculation and segmentation. In FIG. 5, a sequence of at least three computational modules are shown, including first computational module (504), second computational module (506), and segmentation computational module (508). More or fewer computational modules may be present, including potentially many computational modules between the first computational module (504) and the segmentation computational module (508). Any metrics generated by previous modules will be available as the input of the sequential modules. This arrangement solves the problem of metric dependency within the same metric pipeline.

The segmentation computational module (508) may be a final module, as shown, but need not be the final logical module. The segmentation computational module (508) will execute the sub-workflow defined by each user for each of the segments and generate segment-wise metrics. For each metric calculation module, the model monitoring service (see (200) of FIG. 2) will also check for blacklisted metrics that do not need to be monitored. Blacklisted metrics will still be available for sequential steps, but will not be stored in the final results.

The segmentation computational module (508) thereby is programmed to segment the metrics into individual data buckets, which may be referred to as bucket models. In the FIG. 5, three bucket models are formed, first bucket model (510), second bucket model (512), and third bucket model (514), though potentially more or fewer bucket models may be present. Each bucket model may store one metric, such as first metric (516), second metric (518), or third metric (520). However, in some embodiments it may be advantageous to store more than one metric in a single bucket model. Data segmentation is useful in that the corresponding metric can indexed for later use, as well as specifically tailored for future use with respect to modifying or modifying the corresponding machine learning model for which the metric has been calculated.

The data models may be concatenated, clustered, or otherwise organized into a new monitoring event (522). The new monitoring event (522) may then be registered as being one of the monitoring events (220). However, the data may still be organized into bucket models within the overarching data structure that is the new monitoring event (522). In this manner, metrics for multiple machine learning models may be combined for purposes of monitoring or modifying those machine learning models, and in addition the individual metrics for a specific machine learning model may still be used or monitored as described above.

Figure 6:
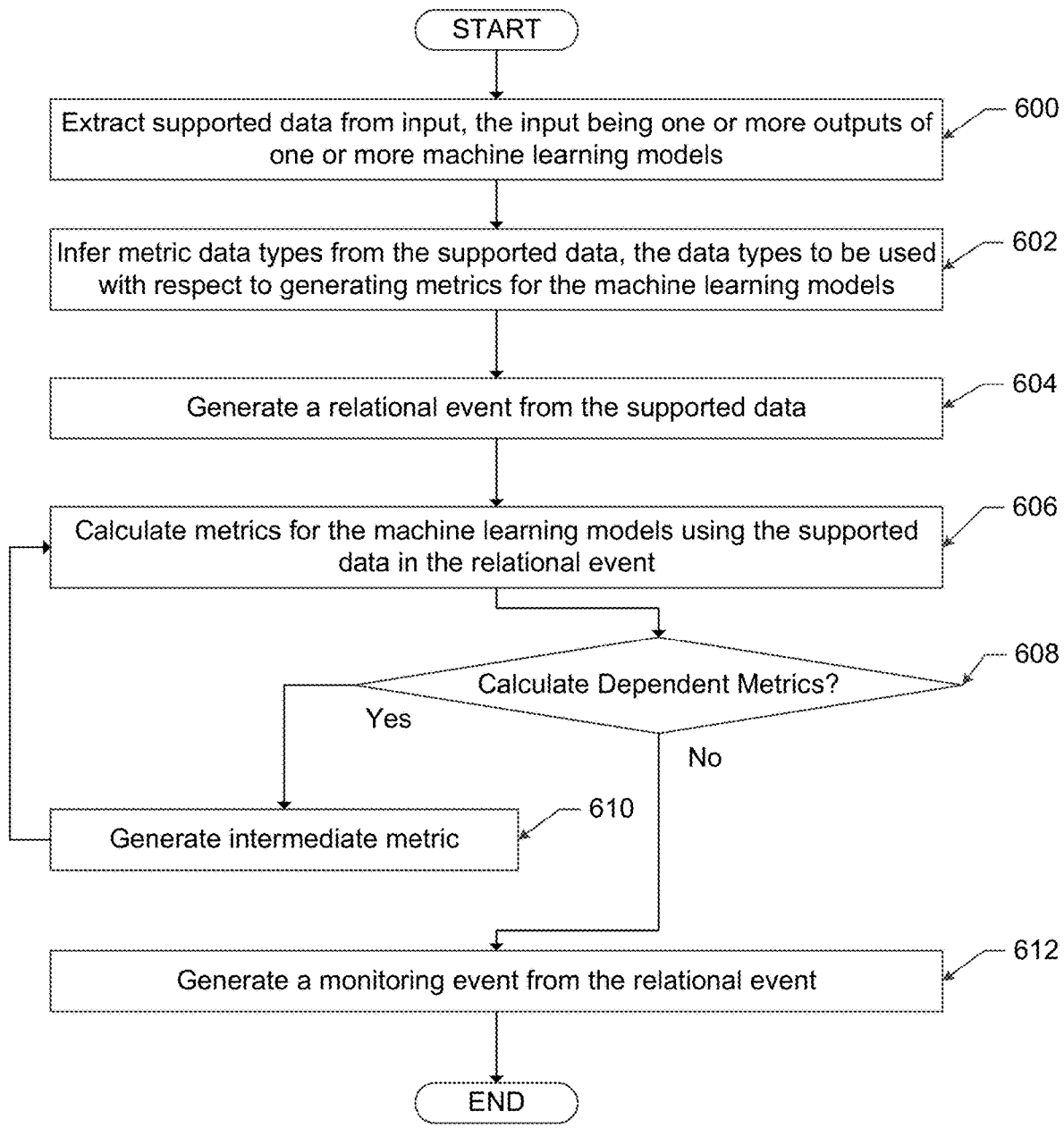
FIG. 6 shows a method, in accordance with one or more embodiments of the invention.

FIG. 6 shows a method, in accordance with one or more embodiments of the invention. The method shown in FIG. 6 may be implemented using the system shown in FIG. 1 or the system shown in FIG. 2 through FIG. 5. The method shown in FIG. 6 may also be executed using the computing system (800) shown in FIG. 8A in a possibly distributed computing environment, such as shown in FIG. 8B.

At step 600, supported data is extracted from the input, the input being one or more outputs of one or more machine learning models. The input may be in different formats or data schemas, and the supported data may be at least a subset of the input after data normalization.

The supported data may be extracted by using a computer program, such as a configuration file, to specify which types of data are to be extracted from the input. Input from multiple input types may be integrated using a domain specific language, such as SQL. A user may identify markers, such as date, file name, etc. as well as a data path field to identify where a particular input is stored. The configuration file may extract only certain data (i.e., a pre-designated format), or may be programmed to specifically exclude certain other data (i.e., not in a pre-designated format) so that only supported data is extracted. Thus, the model monitoring service (see (200) of FIG. 2) may be provided the instructions for determining which part of the input to extract, and from which data source the input may be extracted.

At step 602, data types are inferred from the supported data, the data types to be used with respect to holding generated metrics that describe the results of the machine learning models. In other words, the model monitoring service (see (200) of FIG. 2) may infer which data types or schema will be used with respect to holding generated metrics.

The data types may be inferred by analyzing the available supported data and using the nature of the available supported data or the nature of the input data to determine which data types will be useful for holding generated metrics. For example, if the available supported data is map data, then a known data type for determining metrics for map data may be an "integer type" data structure which holds a value indicating "distance". A "distance" is a numerical value which indicates how close two points on the map are to each other for a given map scale. Thus, an inferred data type for the corresponding metric may be "integer." Knowing that the "integer" data type may be useful for recording metrics for the input, the data pipeline may infer and then specify an integer data structure for which a subsequent metric pipeline may calculate a value for the "integer". In this manner, the data pipeline can generate the data structures useful for generating and recording the metrics for the input.

At step 604, a relational event is generated from the supported data using the inferred data types. The relational event may be generated by scanning the supported data and integrating the supported data into a pre-determined data structure which may be different than the data structures of the inputs from the machine learning models. A specific example of such a data structure is shown with respect to FIG. 7. Data integration may be performed using configuration files, pre-existing data structure templates, and/or SQL statements. As a result, the supported data is integrated into a standard, pre-determined schema which allows for integrated metric generation despite the varied types of inputs from the machine learning models. The relational event may then be stored for later retrieval, such as for metric calculation at the following step in FIG. 6.

At step 606, metrics are calculated for the machine learning models using the supported data structure in the relational event. The relational event may also be referred to as a "first data structure," as the relational event is the first integrated data structure created by the model monitoring service (see (200) of FIG. 2).

The metrics may be calculated using a metric pipeline. The metric pipeline may use multiple pipeline modules, each of which is used to generate a distinct metric for a distinct machine learning model, as shown with respect to FIG. 5. The metric pipeline loads the supported data in the relational event, and uses the supported data as input in the individual programs of the pipeline modules. The output of the pipeline modules are the metrics for the machine learning models.

At step 608, a determination is made whether dependent metrics are to be calculated as part of calculating the final metrics. If dependent metrics are to be calculated (a "yes" determination), then at Step 610, intermediate metrics are generated. The intermediate metrics are then fed back as input into the metrics calculation at step 606. This arrangement is also shown in FIG. 4 and FIG. 5.

Figure 7:
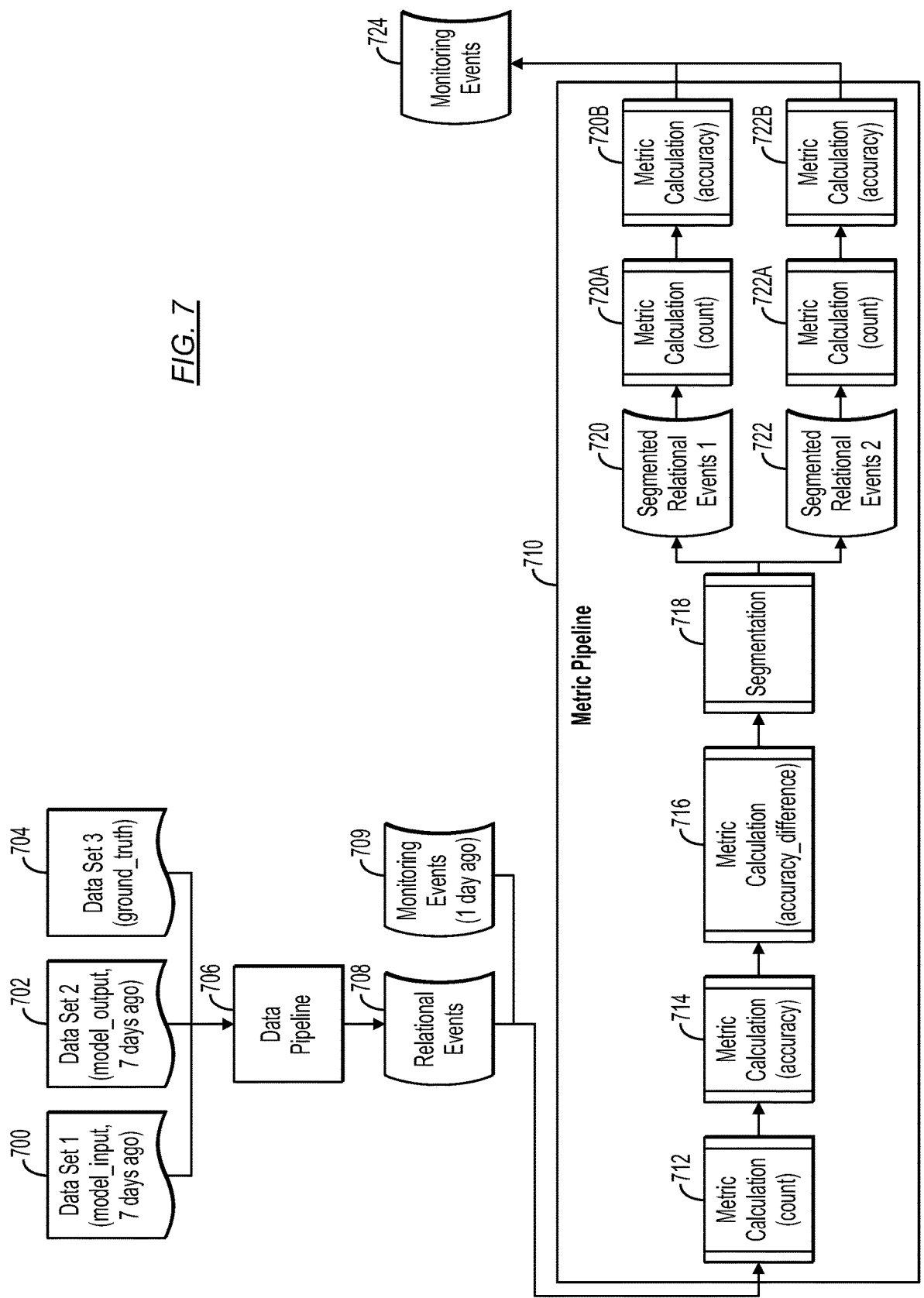
FIG. 7 shows an example of operation of the model monitoring service shown in FIG. 1, in accordance with one or more embodiments of the invention.

If no dependent metrics are to be calculated, or no additional dependent metrics are to be calculated (a "no" determination at Step 608), then, at Step 612 a monitoring event is generated from the relational event. The monitoring event may be generated from the relational event by segmenting the metrics into bucket models (model buckets). The structures useful for performing this step are shown with respect to FIG. 6. An example of segmentation is shown in FIG. 7. In any case, the process of generating the monitoring event results in a second data structure object segmented into data buckets which store the metrics. Thus, referring to FIG. 5, step 612 may include the additional sub-steps of sequentially executing a workflow to produce the metrics, excluding a portion of the metrics; and after sequentially executing the workflow, segmenting remaining metrics into the data buckets.

In an embodiment, the method of FIG. 6 may terminate thereafter. One objective of the model monitoring service (see (200) of FIG. 2) is the generation of the monitoring event.

However, the method of FIG. 6 may be expanded. For example, the monitoring event may be presented. Thus, the method may also include one or more of storing the monitoring event; displaying the monitoring event to a user on a computer display; feeding the monitoring event to a monitoring service including software for generating an alert when data in the monitoring event satisfies a condition; and changing one or more of the machine learning models using the data in the monitoring event. Additionally, a human may manually read the data in the monitoring event after the monitoring event has been visually presented on a computer display.

The method of FIG. 6 may also include, prior to extracting the supported data, the step of performing data normalization. Data normalization may be performed by flattening the input such that the input includes only numerical type data, categorical type data, and lists of numerical or categorical type data, or possibly other types of pre-determined kinds of data.

The method of FIG. 6 contemplates integrating the outputs and generating metrics for the outputs of multiple machine learning models. However, the method of FIG. 6 may also be used when the same machine learning model generates different data at different times. In other words, the one or more embodiments contemplate the possibility that it may be useful to integrate multiple results of the same machine learning model produced at different times.

The method of FIG. 6 may also include additional steps, which may be performed by the model monitoring service (see (200) of FIG. 2) or perhaps some other software. For example, the method of FIG. 6 may also include modifying the monitoring event to have an original format matching at least one of the machine learning models. In this manner, a monitoring event may be made available for use with respect to a specific machine learning model which expects to receive specific data or a specific kind of data. Thus, the method of FIG. 6 may also include modifying one or more of the machine learning models using the monitoring event.

In summary, the model monitoring service (see (200) of FIG. 2) may be used to generate two types of pipelines that can be scheduled to execute in a sequential fashion. The first pipeline is a data pipeline. The data pipeline may load each data source for a defined date range and infer the schema of the data sources or the metrics to be generated later. The data pipeline may execute user provided SQL-like statements to integrate multiple data sources. The data pipeline may convert the integrated result into a standard schema, i.e., the relational events, defined by the model monitoring service (see (200) of FIG. 2). The data pipeline may store the integrated results into an intermediate data storage location.

The second pipeline is a metrics pipeline, or more properly multiple metrics sub-pipelines. The metrics pipeline may load results of data pipeline, and if necessary, load result of previously generated metrics by metric pipelines. The metrics pipeline may execute each metric or segmentation module sequentially. The results from the previous module may be visible to any sequential modules to ensure metric dependencies within the same pipeline. The metrics pipeline may, for any segmentation module, execute the any sub-workflow to generate metrics per segment. The metrics pipeline may store the metrics in a standard schema, i.e., the monitoring events. The monitoring event may be stored into a permanent location for any later monitoring, alerting, or visualization purpose, or reused in other metric pipelines, or used to modify the machine learning models being monitored.

The one or more embodiments have several technical advantages over known machine learning model monitoring techniques. For example, existing techniques focus on a specific machine learning model, and require model owners to setup monitoring programs for each individual machine learning model. Each monitoring program is not useful with respect to monitoring other machine learning models, and is certainly not capable of integrating the monitoring of multiple machine learning models. In contrast, since the one or more embodiments have the capability to load any generic data source, the model monitoring service (see (200) of FIG. 2) is also able to be adopted and embedded in any specific machine learning model platform. Additionally, the model monitoring service (see (200) of FIG. 2) is capable of integrating monitoring of multiple different machine learning models, as described above.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 7 shows an example of operation of the model monitoring service (144) shown in FIG. 1, in accordance with one or more embodiments of the invention. The following example is for explanatory purposes only and not intended to limit the scope of the invention. The example of FIG. 7 may be implemented using the systems shown in FIG. 1 through FIG. 5 and may be considered a specific, non-limiting example of the method of FIG. 6.

In the example of FIG. 7, a data scientist is responsible for monitoring a "fraud watchdog" machine learning model that predicts whether a merchant has a high chance to be a fraudulent user. The data scientist wants to generate data metrics of today's input feature values and today's output score of the model in a daily cadence to allow drift detection in the data. On the other hand, the data scientist also wants to collect the ground truth labels after a certain period of time and wants to combine the labels with the model's prediction results from multiple time periods including 3, 7, 14, 30, 60, and 90 days ago, to evaluate what is the precision, recall, and area-under-the-curve for the machine learning model. The information may help the data scientist to detect the fraud users at 3, 7, 14, 30, 60, and 90 days ahead of time. The data scientist uses at least 11 different machine learning models to perform these functions. Each of the 11 different machine learning models use different input features, output different results, and have different time windows to evaluate the model's performance. Setting up a monitoring pipeline one by one for the 11 machine learning models would be very inefficient and cost the data scientists an undesirable amount of time.

To simplify the above scenario, FIG. 7 shows the performance of three specific tasks using the model monitoring service (see (200) of FIG. 2). The first task is to evaluate the accuracy of a binary classification machine learning model in a 7-day prediction time window. The "accuracy" is the percentage of the data samples for which the machine learning model made a correct prediction. The second task is to calculate the difference between today's accuracy and yesterday's accuracy. The third task is to determine the accuracy value for different genders of users. The "users," in this case, refer to the merchants, some of whom may be fraudulent users instead of real merchants.

The data scientists in this example draw upon three different data sets (first data set (700), second data set (702), and third data set (704) stored in three different locations. The first data set (700) contains the input to the machine learning model from 7 days ago in Table 1:

TABLE 1

| User ID | Age | Active Hours per Day | Gender | Last Login | Has Pet |
| --- | --- | --- | --- | --- | --- |
| 1 | 20 | 1.2 | F | 1580932839 | TRUE |
| 2 | 35 | 2.5 | M | 1580920100 | FALSE |
| 3 | 59 | 0.3 | F | 1580934100 | FALSE |

The second data set (702) contains the output of the model from the machine learning model from 7 days ago in Table 2:

TABLE 2

| User ID | Prediction |
| --- | --- |
| 1 | TRUE |

TABLE 2-continued

| User ID | Prediction |
|---------|------------|
| 2 | FALSE |
| 3 | FALSE |

The third data set (704) contains the ground truth collected by the data scientists to verify the prediction made by the machine learning model today, in table 3:

TABLE 3

| User ID | Prediction |
|---------|------------|
| 1 | TRUE |
| 2 | TRUE |
| 3 | FALSE |

A configuration for the data pipeline (706) in the model monitoring service (see (200) of FIG. 2) may then be as follows in Pseudo Statement 1:

```
sources = [{
    ...
    data-path = "{DATASET1-ROOT-
PATH}/year={YYYY}/month={MM}/day={DD}"
    date-range = {
        from = "7d"
        to = "7d"
    }
    tmp-view-name = "model_input"
    ...
}, {
    ...
    data-path = "{DATASET2-ROOT-
PATH}/year={YYY}/month={MM}/day={DD}"
    date-range = {
        from = "7d"
        to = "7d"
    }
    tmp-view-name = "model_output"
    ...
},
{
    ...
    data-path = "{DATASET3-ROOT-
PATH}/year={YYY}/month={MM}/day={DD}"
    tmp-view-name = "ground_truth"
    ...
}]
integration-sql = ["""
    SELECT user_id, age, daily_active_hours, gender, last_login_time,
has_pet, prediction, label
    FROM model_input
        JOIN model_output ON model_input.user_id = model_output.user_id
        JOIN ground_truth ON model_input.user_id = ground_truth.user_id
"""]
```

Pseudo Statement 1

The "sources" filed in Pseudo Statement 1 lists all three of the first data set (700), second data set (702), and third data set (704). For each source, the "data-path" field contains the path to where the data is stored. If desirable, the user can use special markers such as {YYYY}, {MM}, and {DD} in the file path, and later the special markers may be replaced by the values of year, month, and data that are to be loaded.

For each source, the "date-range" field lists what is the date range a specific source should load. In this example, since the model accuracy is evaluated in a 7-day time window, the model input and output is {from ="7d" to ="7d"}. Special markers {YYYY}, {MM}, {DD} in the two sources then will be replaced by the correct date values which are 7 days earlier than today.

For each source, the "tmp-view-name" field provides a temporary name to refer to this data source. The name can be used in the SQL statement when the data scientist tries to integrate the loaded sources. The "integration-sql" field contains the SQL statement useable to integrate multiple sources. The result of the statement will be standardized into a relational event.

The example integration SQL statement will generate the following normalized data set in Table 4:

TABLE 4

| User ID | Age | Active Hours per Day | Gender | Last Login | Has Pet | Prediction | Label |
|---------|-----|----------------------|--------|------------|---------|------------|-------|
| 1 | 20 | 1.2 | F | 1580932839 | TRUE | TRUE | TRUE |
| 2 | 35 | 2.5 | M | 1580920100 | FALSE | FALSE | TRUE |
| 3 | 59 | 0.3 | F | 1580934100 | FALSE | FALSE | FALSE |

Note that data pipelines of different models will generate results with various schema. Generation of results with different schema will cause difficulty in reusing the later metric calculation components in different machine learning models. Thus, the data pipeline (706) may infer the data types and standardize the above result into the relational events (708), shown in detail in Table 5:

TABLE 5

| Entity ID | Entity Value | ... | VarsBool | VarsInt | VarsLong | VarsDouble | VarsString |
|-----------|--------------|-----|----------|---------|----------|------------|------------|
| user_id | 1 | | { "has_pet": True, "prediction": True, "label": True } | { "user_id": 1, "age": 20 } | { "last_login_time": 1580932839 } | { "daily_active_hours": 1.2 } | {"gender": "F"} |
| user_id | 2 | | { "has_pet": False, | { "user_id": 2, | { "last_login_time": | { "daily_active | {"gender": "M"} |

TABLE 5-continued

| Entity ID | Entity Value | ... | VarsBool | VarsInt | VarsLong | VarsDouble | VarsString |
|---|---|---|---|---|---|---|---|
| | | | "prediction": False, "label": True } | { age : 35 } | { 1580920100 } | { hours": 2.5 } | |
| user_id | 3 | | { "has_pet": False, "prediction": False, "label": False } | { "user_id": 3, "age": 59 } | { "last_login_time": 1580934100 } | { "daily_active_hours": 0.3 } | {"gender" : "F"} |

Attention is now turned to the generation of the metrics using the metric pipeline (710). An example configuration file for the metric pipeline (710) may be as follows in Pseudo Statement 2:

PSEUDO STATEMENT 2

```
pipelines = [{
  relational-event-source = [{
    ...
    execution-time = "latest"
  }]
  monitoring-event-source = [{
    ...
    date-range = {
      from = "1d"
      to = "1d"
    }
    execution-time = "latest"
  }]
  workflow = [{
    ...
    module-type = "metric"
    class-name = "count"
    conf = {
      correct-prediction = "varsBool['prediction'] = varsBool['label']"
    }
  }, {
    ...
    module-type = "metric"
    class-name = "accuracy"
  }, {
    ...
    module-type = "metric"
    class-name = "accuracy_difference"
  }, {
    ...
    module-type = "segmentation"
    class-name = "categorical_segmentation"
    conf = {
      field-name = "gender"
    },
    worklow = [{
      ...
      module-type = "metric"
      class-name = "count"
      conf = {
        correct-prediction = "varsBool['prediction'] = varsBool['label']"
      }
    }, {
      ...
      module-type = "metric"
      class-name = "accuracy"
    }]
  }]
}]
}
```

PSEUDO STATEMENT 2

The "pipelines" field in pseudo statement 2 contains the configurations of multiple metric pipelines that can be run in parallel. However, in this example, only 1 metric pipeline (710) is present.

The "relational-event-source" in pseudo statement 2 contains the configurations for the relational events (708) that the metric pipeline (710) is to load. More specifically, the term "execution-time"="latest" states that the metric pipeline (710) should load from the latest execution result of the data pipeline (706).

The "monitoring-event-source" in pseudo statement 2 contains the configurations for monitoring events (724) that the metric pipeline (710) is to load. Since the difference between today's accuracy and yesterday's accuracy is to be computed, the "date-range" is used to instruct the metric pipeline (710) to load from yesterday's monitoring events, as yesterday's events (prior monitoring events (709)) contains yesterday's accuracy. Additionally, the term, "execution-time"="latest" denotes that the most recent results are to be loaded. The most recent results to be loaded may be yesterday's last generated results, but could be more recent results.

The "workflow" in pseudo statement 2 describes the data workflow of metric pipeline (710) shown in FIG. 7. The first metric module (712) in the workflow is a "metric," meaning that the module will generate some metrics. In the example, the first metric is called "count". The "count" is able to be configured by passing one parameter called "correct-prediction", where the data scientist can specify what is considered to be a "correctly predicted data sample". In this example, the data scientist has designated that a sample is correctly predicted if the "prediction" value is the same as the "label" value. Suppose the "count" metric module also outputs the total count of all relational events. As a result, the output of the first metric module (712) will contain two metrics: {"correct-prediction-count": 2, and "total-count": 3}.

The second metric module (714) is called "accuracy," i.e., the percentage of data samples predicted correctly. To save computation time, the metric pipeline (710) allows any module in the workflow to reuse the results generated by previous modules. In this case, in order to compute accuracy, the data samples do not need to be recounted. Instead, the metric pipeline (710) may directly calculate the division of the result from the previous "count" module. Thus, the result of the second metric module (714) is the result {"accuracy": 0.667}.

The third metric module (716) is called "accuracy_difference". Since the third metric module (716) module will see the previous module's result of today's "accuracy" and because yesterday's monitoring event (prior monitoring events (709)) containing yesterday's "accuracy" was loaded, the "accuracy_difference" may be calculated by subtraction to determine a value like {"accuracy_difference": 0.167}. The result shows the model's accuracy has improved by comparing yesterday's result to today's result.

The fourth metric module (718) is called "categorical_segmentation". The fourth metric module (718) splits the loaded relational events into different segments, also referred to as data buckets or model buckets. More specifically, in this example, the relational events (708) are split by the value of "gender". As a result, 2 subsets of segmented relational events are generated, one for female ("F") (segmented relational events 1 (720)) and one for male ("M") (segmented relational events 2 (722)). In the "workflow" field within the fourth metric module (718), a sub workflow is defined to use "count" and "accuracy" metric modules to recompute the accuracy for each gender group. In other words, a first sub-workflow uses a first count metric module (720A) to recompute the count for the female gender group; a second sub-workflow uses a second count metric module (722A) to recompute the count for the male gender group; a third sub-workflow uses a first accuracy metric module (720B) to recompute the accuracy for the female gender group; and a fourth sub-workflow uses a second accuracy metric module (722B) to recompute the accuracy for the male gender group.

In the example of FIG. 7 the female segment has: {"accuracy": 1.0} and the male segment has: {"accuracy": 0.0}. The results indicate that the machine learning model currently performs better when predicting whether female users are fraudulent users, relative to the machine learning model predicting whether male users are fraudulent users.

Finally, the results of the metric pipeline (710) are stored in a denormalized set of monitoring events (724). The monitoring events (724) is "denormalized" in that the monitoring data is translated back into the types of data useable with respect to the original machine learning model. In this manner, the monitoring events (724) may be used to update or otherwise monitor the specific machine learning model in question. An example of the monitoring events (724) is presented in Table 6:

TABLE 6

| ... (Model Related Fields) | Metric Name | Sub-Category | Int Value | Double Value | ... Other Value Types |
|---|---|---|---|---|---|
| ... | Correct Prediction Count Total | {"segment": "global"} | 2 | NULL | NULL |
| ... | Count | {"segment": "global"} | 3 | NULL | NULL |
| ... | Accuracy | {"segment": "global"} | NULL | 0.667 | NULL |
| ... | Accuracy Difference | {"segment": "global"} | NULL | 0.167 | NULL |
| ... | Correct Prediction Count Total | "{segment: "gender_F"} | 2 | NULL | NULL |
| ... | Count | "{segment: "gender_F"} | 2 | NULL | NULL |
| ... | Accuracy | "{segment: "gender_F"} | NULL | 1 | NULL |
| ... | Correct Prediction Count Total | "{segment: "gender_F"} | 0 | NULL | NULL |
| ... | Count | "{segment: "gender_M"} | 1 | NULL | NULL |
| ... | Accuracy | "{segment: "gender_M"} | NULL | 0 | NULL |

The monitoring events (724) may be presented in other ways, as described above with respect to FIG. 6.

The example of FIG. 7 is simplified. Many different examples are possible. For example, the schema of the data structures that form the relational events (708) and the monitoring events (724) may take many different forms. Some examples of the possible schema for the relational events (708) are presented as follows in Table 7:

TABLE 7

| Field | Data Type | Description |
|---|---|---|
| Artifact Type | String | Model-level information. A string to denote the type of artifact. For machine learning models, it is always "model" |
| Artifact ID | String | Model-level information. A unique string typed ID to identify one specific model |
| Artifact Name | String | Model-level information. The name of the model |
| Artifact Version | String | Model-level information. The version associated with the model |
| Governance ID | Map[String, String] | Entity-level information. This field is useful for privacy control purposes (like GDPR, CCPA etc.). |

TABLE 7-continued

| Field | Data Type | Description |
|---|---|---|
| Entity Type | String | Entity-level information. The name of the field that contains the ID that identifies the data sample. |
| Entity Value | String | Entity-level information. The actual value of the entity ID |
| VarsBool | Map[String, Boolean] | A map stores the field name -> value (true or false) mapping for all boolean fields |
| VarsInt | Map[String, Int] | A map stores the field name -> value mapping for all integer fields |
| VarsLong | Map[String, Long] | A map stores the field name -> value mapping for all long (larger integers) fields |
| VarsDouble | Map[String, Double] | A map stores the field name -> value mapping for all double precision (real numbers) fields |
| Vars String | Map[String, String] | A map stores the field name -> value mapping for all string (real numbers) fields |
| VarsBoolList | Map[String, List[Boolean]] | A map stores the field name -> value (true or false) mapping for all boolean list fields |
| VarsIntList | Map[String, List[Int]] | A map stores the field name -> value mapping for all integer list fields |
| VarsLongList | Map[String, List[Long]] | A map stores the field name -> value mapping for all long (larger integers) list fields |
| VarsDoubleList | Map[String, List[Double]] | A map stores the field name -> value mapping for all double precision (real numbers) list fields |
| VarsStringList | Map[String, List[String]] | A map stores the field name -> value mapping for all string (real numbers) list fields |
| Year | Int | The year value associated with this relational event |
| Month | Int | The month value associated with this relational event |
| Day | Int | The day value associated with this relational event |
| Execution Time | Long | An epoch timestamp that associated with execution time when the relational event is generated |

Some examples of the possible schema for the monitoring events (724) are presented as follows in Table 8:

TABLE 8

| Field | Sub-Field | Data Type | Description |
|---|---|---|---|
| Artifact Type | N/A | String | Model-level information. A string to denote the type of artifact. For machine learning models, it is always "model" |
| Artifact ID | N/A | String | Model-level information. A unique string typed ID to identify one specific model |
| Artifact Name | N/A | String | Model-level information. The name of the model |
| Artifact Version | N/A | String | Model-level information. The version associated with the model |
| Category | N/A | String | Metric-level information. A string typed field that can be used to categorize different monitoring events. |
| Subcategory | N/A | Map[String, String] | Metric-level information. A string to string map that stores additional category information. For example, the segment name generated by segmentation module. |
| Tags | N/A | List[String] | Metric-level information. Additional user-defined tags to tag metrics. |
| Value | BoolValue | Boolean | The boolean value of the metric |
| Value | IntValue | Int | The integer value of the metric |
| Value | LongValue | Long | The long (larger integer) value of the metric |
| Value | DoubleValue | Double | The double (real number) value of the metric |
| Value | StringValue | String | The string value of the metric |
| Value | BoolListValue | List[Boolean] | The boolean list value of the metric |
| Value | IntListValue | List[Int] | The integer list value of the metric |
| Value | LongListValue | List[Long] | The long list value of the metric |
| Value | DoubleListValue | List[Double] | The double list value of the metric |
| Value | StringListValue | List[String] | The string list value of the metric |
| Year | N/A | Int | The year value associated with this monitoring event |
| Month | N/A | Int | The month value associated with this monitoring event |
| Day | N/A | Int | The day value associated with this monitoring event |
| ExecutionTime | N/A | Long | An epoch timestamp that associated with execution time when the monitoring event is generated |

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be used improved by including the features and elements described in the disclosure.

Figure 8A:
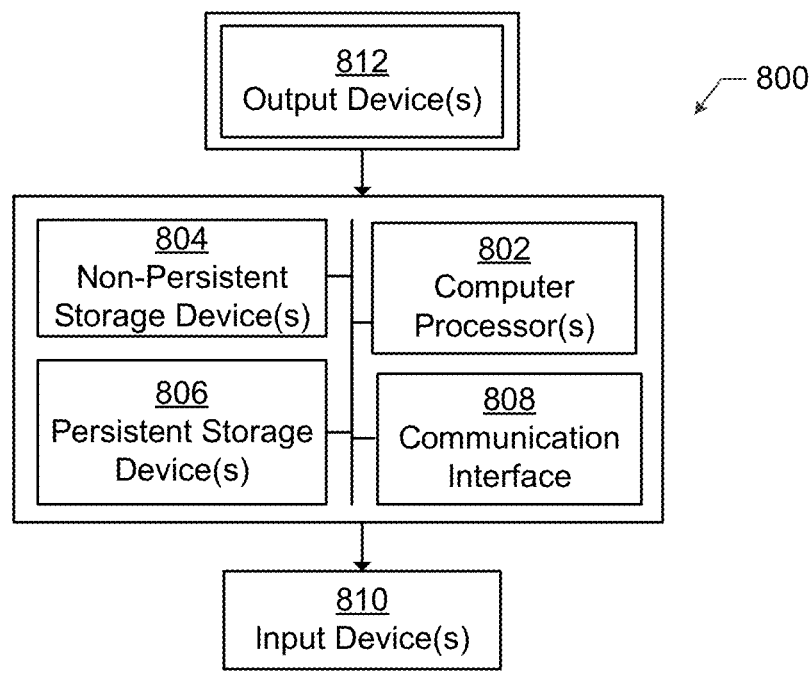
FIG. 8A and FIG. 8B show a computing system and a network environment, in accordance with one or more embodiments of the invention.
Figure 8B:
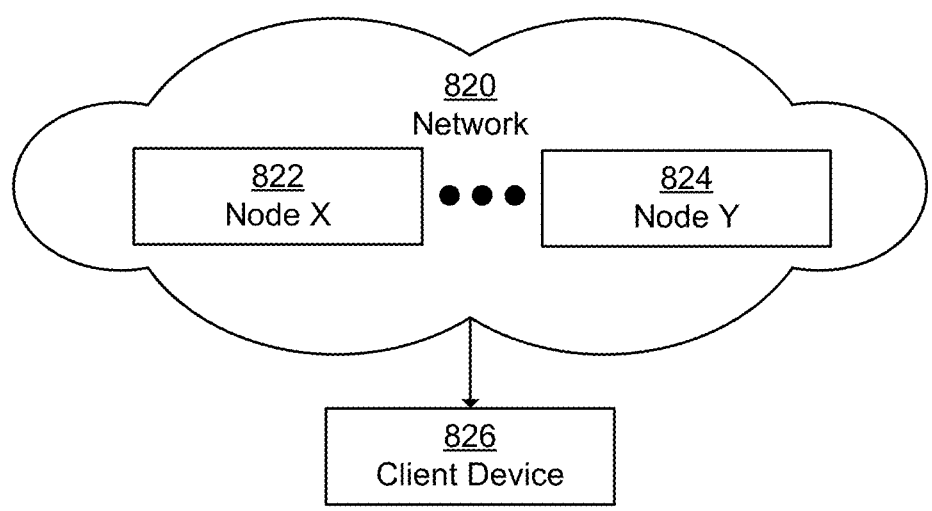

For example, as shown in FIG. 8A, the computing system (800) may include one or more computer processor(s) (802), non-persistent storage(s) (804) (e.g., volatile memory, such as random access memory (RAM), cache memory), persistent storage device(s) (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) (802) may be one or more cores or micro-cores of a processor. The computing system (800) may also include one or more input device(s) (810), such as a touchscreen, keyboard, mouse, microphone, touchpad, electronic pen, or any other type of input device(s) (810).

The communication interface (808) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output device(s) (812), such as a screen (e.g., a liquid crystal display (LCD), a plasma display, touchscreen, cathode ray tube (CRT) monitor, projector, or other display device), a printer, external storage, or any other output device(s) (812). One or more of the output device(s) (812) may be the same or different from the input device(s) (810). The input and output device(s) (810 and 812) may be locally or remotely connected to the computer processor(s) (802), non-persistent storage device(s) (804), and persistent storage device(s) (806). Many different types of computing systems exist, and the aforementioned input and output device(s) (810 and 812) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system (800) shown in FIG. 8A, or a group of nodes combined may correspond to the computing system (800) shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of one or more embodiments of the invention.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system (800) performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device(s) (810). In response to selecting a particular item, information regarding the particular item may be obtained from persistent or non-persistent storage by the computer processor(s) (802). Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system (800), in performing one or more embodiments of the invention, may extract one or more data items from the obtained data. For example, the extraction may be performed as follows by the computing system (800) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system (800). For example, the computing system (800) of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (800) in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system (800). For example, data may be presented to a user using a vibration generated by a handheld computer device with a predefined duration and intensity of the vibration to communicate the data.

The above description of functions presents only a few examples of functions performed by the computing system (800) of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    extracting, from an input, supported data,
        wherein the input comprises a plurality of outputs from a plurality of machine learning models in a plurality of different formats, and
        wherein the supported data comprises at least a subset of the input after data normalization;
    inferring, from the supported data, a plurality of data types to be used with respect to generating a plurality of metrics for the plurality of machine learning models;
    generating, from the supported data and using the plurality of data types, a relational event comprising the supported data, wherein the relational event further comprises a first data structure object including the plurality of data types and having a first data structure different than the plurality of different formats;
    calculating, using the supported data in the first data structure, the plurality of metrics for the plurality of machine learning models;
    generating, from the relational event, a monitoring event, wherein the monitoring event comprises a second data structure object segmented into a plurality of data buckets which store the plurality of metrics.

2. The method of claim 1, further comprising:
    presenting the monitoring event.

3. The method of claim 2, wherein presenting the monitoring event comprises at least one of:
    storing the monitoring event;
    displaying the monitoring event to a user on a computer display;
    feeding the monitoring event to a monitoring service comprising software for generating an alert when data in the monitoring event satisfies a condition; and
    changing one or more of the plurality of the machine learning models using the data in the monitoring event.

4. The method of claim 1, further comprising:
    prior to extracting, normalizing the input.

5. The method of claim 4 wherein normalizing comprises:
    flattening the input such that the input comprises only numerical type data, categorical type data, and lists of numerical or categorical type data.

6. The method of claim 4, wherein extracting the supported data comprises:
    extracting only data in the input compatible with the relational event.

7. The method of claim 1, wherein the first machine learning model and the second machine learning model comprise one machine learning model outputting different data at different times.

8. The method of claim 1, further comprising:
    modifying the monitoring event to have an original format matching at least one of the plurality of machine learning models; and
    modifying the at least one of the plurality of machine learning models using the monitoring event.

9. The method of claim 1, wherein the input further comprises previously generated monitoring events, and wherein the supported data includes at least some information from the previously generated monitoring events.

10. The method of claim 1,
    wherein calculating the plurality of metrics is performed by a metric pipeline, and
    wherein the method further comprises executing the metric pipeline to:
        sequentially execute a workflow to produce the plurality of metrics,
        exclude a portion of the plurality of metrics, and
        after sequentially executing the workflow, segment remaining metrics into the plurality of data buckets.

11. A system comprising:
    a processor;
    a data repository, comprising a non-transitory computer readable storage medium, in communication with the processor and storing:

a first result of a first machine learning model, the first result comprising a first initial data structure having a first format, a second result of a second machine learning model, the second result comprising a second initial data structure having a second format different than the first format, supported data comprising at least a subset of the first result and the second result after data normalization, a relational event, comprising a first data structure which stores the supported data, a plurality of metrics for the first machine learning model and the second machine learning model, and a monitoring event, comprising a second data structure storing the plurality of metrics in a plurality of data buckets;

a data pipeline programmed, when executed by the processor, to generate the relational event by extracting the supported data from the first result and the second result into the relational event;

a metric pipeline programmed, when executed by the processor, to calculate the plurality of metrics, and generate the monitoring event from the plurality of metrics;

a model monitoring service comprising the data pipeline and the metric pipeline; and an application programming interface (API) in communication with the model monitoring service, the API, when executed by the processor, configured to allow a user to modify or monitor operation of the model monitoring service.

12. The system of claim 11 wherein the model monitoring service is further configured to present the monitoring event.

13. The system of claim 12, wherein the model monitoring service is further configured to present the monitoring event by performing, when executed, at least one of:

storing the monitoring event, displaying the monitoring event to a user on a computer display, feeding the monitoring event to a monitoring service comprising software for generating an alert when data in the monitoring event satisfies a condition, and changing one or more of the plurality of the machine learning models using the data in the monitoring event.

14. The system of claim 11, wherein the data pipeline is further configured to, prior to extracting, normalize the input.

15. The system of claim 11, wherein the data pipeline is further configured to extract only data in the input compatible with the relational event.

16. The system of claim 11, wherein the model monitoring service is further configured, when executed, to:

modify the monitoring event to have an original format matching at least one of the plurality of machine learning models, and modify the at least one of the plurality of machine learning models using the monitoring event.

17. The system of claim 11, wherein:

the metric pipeline comprises a plurality of modules, each of the plurality of modules is configured to generate a different type of metric, and the metric pipeline is further configured to segment each of the different types of metrics into corresponding ones of the plurality of data buckets.

18. The system of claim 11, wherein the relational event further stores information from past monitoring events.

19. A method comprising:

extracting, from an input, supported data, wherein the input comprises a plurality of outputs from a plurality of machine learning models in a plurality of different formats, and wherein the supported data comprises at least a subset of the input after data normalization;

inferring, from the supported data, a plurality of data types to be used with respect to generating a plurality of metrics for the plurality of machine learning models;

generating, from the supported data and using the plurality of data types, a relational event comprising the supported data, wherein the relational event further comprises a first data structure object including the plurality of data types and having a first data structure different than the plurality of different formats;

calculating, using the supported data in the first data structure, the plurality of metrics for at least one of the plurality of machine learning models, wherein calculating further comprises:

identifying dependent metrics in the plurality of metrics, using intervening metrics computed from previous steps within an execution pipeline that calculates the plurality of metrics to calculate the dependent metrics; and generating, from the relational event, a monitoring event, wherein the monitoring event comprises a second data structure object segmented into a plurality of data buckets which store the plurality of metrics.

20. The method of claim 19, further comprising:

presenting the monitoring event.

\* \* \* \* \*